US012680343B2

(12) United States Patent
Zhao et al.

(10) Patent No.: US 12,680,343 B2
(45) Date of Patent: Jul. 14, 2026

(54) DOOR LOCK WITH CLUTCH

(71) Applicant: SimpliSafe, Inc., Boston, MA (US)

(72) Inventors: Yong Zhao, Medford, MA (US); Kwok Chu Lee, Fanling (CN); Kwok Tung Law, Fanling (CN)

(73) Assignee: SimpliSafe, Inc., Boston, MA (US)

( * ) Notice: Subject to any disclaimer, the term of this patent is extended or adjusted under 35 U.S.C. 154(b) by 1023 days.

(21) Appl. No.: 16/215,868

(22) Filed: Dec. 11, 2018

(65) Prior Publication Data

US 2020/0181945 A1 Jun. 11, 2020

(51) Int. Cl.
*E05B 47/00* (2006.01)

(52) U.S. Cl.
CPC .... *E05B 47/0012* (2013.01); *E05B 2047/002* (2013.01); *E05B 2047/0026* (2013.01); *E05B 2047/0067* (2013.01); *E05B 2047/0091* (2013.01)

(58) Field of Classification Search
CPC .. E05B 47/00; E05B 47/0001; E05B 47/0012; E05B 47/02; E05B 47/026; E05B 2047/0017; E05B 2047/002; E05B 2047/0026; E05B 2047/0031; E05B 2047/0032; E05B 2047/0036; E05B 2047/0067; E05B 2047/0069; E05B 2047/0091; E05B 17/0054; E05B 17/0058; Y10T 292/57; Y10T 292/1021; Y10T 292/82; F16H 3/34
See application file for complete search history.

(56) References Cited

U.S. PATENT DOCUMENTS

| | | | | |
|---|---|---|---|---|
| 1,200,620 A * | 10/1916 | Johnson | F16H 3/34 74/354 |
| 3,397,905 A | 8/1968 | Banse | |
| 3,528,309 A * | 9/1970 | Laybourn | F16H 3/00 74/404 |
| 4,137,789 A | 2/1979 | Herleth | |
| 4,845,490 A | 7/1989 | Ward et al. | |

(Continued)

FOREIGN PATENT DOCUMENTS

| | | |
|---|---|---|
| AU | 2011224106 A1 | 4/2012 |
| CN | 103225452 A | 7/2013 |

(Continued)

OTHER PUBLICATIONS

Annotated translation of FR 2849084 A1 (previously cited in IDS) (Year: 2004).*

(Continued)

*Primary Examiner* — Christine M Mills
*Assistant Examiner* — Peter H Watson
(74) *Attorney, Agent, or Firm* — Secant IP, P.L.L.C.

(57) ABSTRACT

A door lock that includes a clutch mechanically arranged between a drive motor and a lock drive with the clutch having a clutch gear that is movable between engaged and disengaged positions to selectively couple and uncouple the drive motor from the lock drive from the drive motor. The clutch gear may be movable along a pathway between engaged and disengaged positions, e.g., in a direction perpendicular to a rotation axis of the clutch gear. The clutch gear may selectively couple and uncouple the drive motor from the lock drive based on movement of the drive motor.

22 Claims, 7 Drawing Sheets

(56) References Cited

U.S. PATENT DOCUMENTS

| | | | | |
|---|---|---|---|---|
| 5,369,913 | A | 12/1994 | Brickner | |
| 5,421,178 | A | 6/1995 | Hamel et al. | |
| 5,473,236 | A | 12/1995 | Frolov | |
| 5,474,348 | A | 12/1995 | Palmer et al. | |
| 5,628,216 | A | 5/1997 | Qureshi et al. | |
| 5,640,863 | A | 6/1997 | Frolov | |
| 5,646,605 | A | 7/1997 | Leonaggeo et al. | |
| 5,712,626 | A | 1/1998 | Andreou et al. | |
| 5,782,118 | A | 7/1998 | Chamberlain et al. | |
| 5,857,365 | A | 1/1999 | Armstrong | |
| 5,931,430 | A | 8/1999 | Palmer | |
| 6,076,870 | A | 6/2000 | Frolov | |
| 6,225,903 | B1 | 5/2001 | Soloway et al. | |
| 6,330,817 | B1 | 12/2001 | Frolov | |
| 6,354,121 | B1 | 3/2002 | Frolov | |
| 6,442,986 | B1 | 9/2002 | Russell et al. | |
| D552,964 | S | 10/2007 | Bogdanov et al. | |
| 7,373,795 | B2 * | 5/2008 | Kilbourne | G07C 9/00309 70/462 |
| 7,391,319 | B1 | 6/2008 | Walker | |
| 7,872,577 | B2 | 1/2011 | Frolov | |
| 9,077,716 | B2 | 7/2015 | Myers et al. | |
| 9,262,879 | B2 | 2/2016 | Ahearn et al. | |
| 9,322,194 | B2 | 4/2016 | Cheng et al. | |
| 9,359,794 | B2 | 6/2016 | Cheng | |
| 9,534,420 | B1 | 1/2017 | Cheng et al. | |
| 9,690,272 | B2 | 6/2017 | Chin et al. | |
| 9,892,579 | B2 | 2/2018 | Ku | |
| 9,922,481 | B2 | 3/2018 | Johnson et al. | |
| 2001/0025517 | A1 | 10/2001 | Bates et al. | |
| 2002/0095958 | A1 | 7/2002 | Bates et al. | |
| 2003/0179074 | A1 | 9/2003 | Palomaki et al. | |
| 2004/0177663 | A1 | 9/2004 | Walsh, III et al. | |
| 2005/0030178 | A1 | 2/2005 | Meijer | |
| 2005/0050928 | A1 | 3/2005 | Frolov et al. | |
| 2005/0167995 | A1 | 8/2005 | Wallis et al. | |
| 2005/0179267 | A1 | 8/2005 | Cote et al. | |
| 2006/0101878 | A1 | 5/2006 | Dickhans et al. | |
| 2007/0157684 | A1 | 7/2007 | Bogdanov et al. | |
| 2007/0204663 | A1 | 9/2007 | Lee | |
| 2007/0209413 | A1 | 9/2007 | Dobbs | |
| 2008/0142593 | A1 | 6/2008 | Walsh et al. | |
| 2008/0169655 | A1 | 7/2008 | Gomez Gonzalez | |
| 2008/0236213 | A1 | 10/2008 | Blanch | |
| 2009/0027197 | A1 | 1/2009 | Frolov | |
| 2009/0277232 | A1 | 11/2009 | Walsh, III | |
| 2009/0282877 | A1 | 11/2009 | Laverty et al. | |
| 2010/0026487 | A1 | 2/2010 | Hershkovitz | |
| 2010/0089109 | A1 | 4/2010 | Bliding et al. | |
| 2010/0257906 | A1 | 10/2010 | Sorensen et al. | |
| 2010/0294008 | A1 | 11/2010 | Bogdanov et al. | |
| 2011/0036131 | A1 | 2/2011 | Chiou et al. | |
| 2011/0067464 | A1 | 3/2011 | Chiou et al. | |
| 2011/0203331 | A1 | 8/2011 | Picard et al. | |
| 2012/0061974 | A1 | 3/2012 | Laverty et al. | |
| 2012/0212001 | A1 | 8/2012 | Benitez et al. | |
| 2012/0324967 | A1 | 12/2012 | Goren et al. | |
| 2013/0031940 | A1 | 2/2013 | Romero | |
| 2013/0061644 | A1 | 3/2013 | Trent et al. | |
| 2013/0192316 | A1 | 8/2013 | McKibben et al. | |
| 2013/0318519 | A1 | 11/2013 | Coolidge | |
| 2013/0335222 | A1 | 12/2013 | Comerford et al. | |
| 2014/0109633 | A1 | 4/2014 | Romero | |
| 2014/0109634 | A1 | 4/2014 | Almomani et al. | |
| 2014/0113563 | A1 | 4/2014 | Almomani et al. | |
| 2014/0118107 | A1 | 5/2014 | Almomani | |
| 2014/0157842 | A1 | 6/2014 | Almomani et al. | |
| 2014/0159392 | A1 | 6/2014 | Tsai et al. | |
| 2014/0165673 | A1 | 6/2014 | Tyner et al. | |
| 2014/0250956 | A1 | 9/2014 | Chong | |
| 2014/0260448 | A1 | 9/2014 | Beck et al. | |
| 2014/0260449 | A1 | 9/2014 | Uyeda et al. | |
| 2014/0260451 | A1 | 9/2014 | Quach et al. | |
| 2014/0265359 | A1 | 9/2014 | Cheng et al. | |
| 2014/0292001 | A1 | 10/2014 | Nunez et al. | |
| 2015/0184425 | A1 | 7/2015 | Ellis et al. | |
| 2015/0240528 | A1 | 8/2015 | Mani et al. | |
| 2015/0240529 | A1 | 8/2015 | Dore Vasudevan et al. | |
| 2015/0247345 | A1 | 9/2015 | Carpenter et al. | |
| 2015/0281228 | A1 | 10/2015 | Rettig et al. | |
| 2016/0040452 | A1 | 2/2016 | Ku | |
| 2016/0060904 | A1 | 3/2016 | Dore Vasudevan et al. | |
| 2016/0115720 | A1 | 4/2016 | Wong et al. | |
| 2016/0145898 | A1 | 5/2016 | Ohl et al. | |
| 2016/0168888 | A1 | 6/2016 | Farias et al. | |
| 2016/0253855 | A1 | 9/2016 | Lowder | |
| 2016/0341537 | A1 | 11/2016 | Ku | |
| 2017/0002586 | A1 | 1/2017 | Lee | |
| 2017/0037937 | A1 | 2/2017 | Ku | |
| 2017/0161975 | A1 | 6/2017 | Peng et al. | |
| 2017/0191287 | A1 | 7/2017 | Mittleman et al. | |
| 2017/0204637 | A1 | 7/2017 | Matyko | |
| 2017/0342742 | A1 | 11/2017 | Snodgrass | |
| 2017/0342750 | A1 | 11/2017 | Hiramine | |
| 2018/0061163 | A1 | 3/2018 | Ku | |
| 2018/0075720 | A1 | 3/2018 | Davies et al. | |
| 2018/0108228 | A1 | 4/2018 | Lovejoy | |
| 2018/0320412 | A1 | 11/2018 | Matosian | |
| 2018/0320413 | A1 | 11/2018 | Wong | |
| 2018/0340352 | A1 | 11/2018 | Compton | |
| 2019/0019365 | A1 | 1/2019 | Lee | |
| 2019/0257116 | A1 | 8/2019 | Coster et al. | |
| 2019/0309539 | A1 | 10/2019 | Mukundala et al. | |
| 2019/0383057 | A1 | 12/2019 | Larson | |
| 2020/0002973 | A1 | 1/2020 | Hill | |
| 2020/0011088 | A1 | 1/2020 | Harris | |
| 2020/0011090 | A1 | 1/2020 | Ku et al. | |
| 2020/0032551 | A1 | 1/2020 | Holmes et al. | |
| 2020/0071955 | A1 | 3/2020 | Binek et al. | |
| 2020/0123808 | A1 | 4/2020 | Lovejoy et al. | |
| 2020/0149317 | A1 | 5/2020 | Seacat et al. | |
| 2020/0149320 | A1 | 5/2020 | Pfunder | |
| 2020/0157851 | A1 | 5/2020 | Fodstad et al. | |
| 2020/0248484 | A1 | 8/2020 | Arlinghaus et al. | |
| 2020/0263449 | A1 | 8/2020 | Rai et al. | |
| 2020/0291678 | A1 | 9/2020 | Eickhoff et al. | |
| 2021/0040775 | A1 | 2/2021 | Kusanale et al. | |
| 2021/0054657 | A1 | 2/2021 | Luebeck et al. | |
| 2021/0079691 | A1 | 3/2021 | Sundkvist et al. | |
| 2021/0148136 | A1 | 5/2021 | Kim et al. | |
| 2021/0174620 | A1 | 6/2021 | Kusanale et al. | |
| 2021/0214970 | A1 | 7/2021 | Yang et al. | |
| 2021/0348422 | A1 | 11/2021 | Kumar et al. | |

FOREIGN PATENT DOCUMENTS

| | | | | | |
|---|---|---|---|---|---|
| CN | 104213759 | A | | 12/2014 | |
| CN | 105840003 | A | | 8/2016 | |
| CN | 106703532 | A | * | 5/2017 | |
| CN | 107646062 | A | | 1/2018 | |
| CN | 107795195 | A | | 3/2018 | |
| CN | 207620532 | U | | 7/2018 | |
| CN | 108506441 | A | * | 9/2018 | E05B 47/0012 |
| CN | 108643715 | A | | 10/2018 | |
| CN | 110242112 | A | | 9/2019 | |
| CN | 110388138 | A | | 10/2019 | |
| CN | 112343426 | A | | 2/2021 | |
| CN | 112396732 | A | | 2/2021 | |
| CN | 213774876 | U | | 7/2021 | |
| CN | 113250536 | A | | 8/2021 | |
| DE | 41 02 892 | A1 | | 8/1992 | |
| DE | 10 2004 021 704 | B3 | | 12/2005 | |
| DE | 10 2006 001 478 | A1 | | 7/2007 | |
| DE | 10 2011 081 789 | A1 | | 4/2012 | |
| EP | 0 315 766 | A2 | | 5/1989 | |
| EP | 0 505 887 | A1 | | 9/1992 | |
| EP | 0 676 518 | A2 | | 10/1995 | |
| EP | 2 136 019 | A2 | | 12/2009 | |
| EP | 2 208 840 | A2 | | 7/2010 | |
| EP | 2 746 497 | A2 | | 6/2014 | |
| EP | 2 762 661 | A1 | | 8/2014 | |
| EP | 3 599 329 | A1 | | 1/2020 | |
| FR | 2897135 | A1 | * | 8/2007 | F16H 1/22 |
| GB | 2016645 | A | * | 9/1979 | F16H 3/003 |

(56) References Cited

FOREIGN PATENT DOCUMENTS

| | | | | | |
|---|---|---|---|---|---|
| JP | H06-108716 | A | | 4/1994 | |
| JP | H07197708 | A | * | 8/1995 | |
| JP | 2010-112002 | A | | 5/2010 | |
| JP | 2012207442 | A | * | 10/2012 | |
| JP | 2015-202767 | A | | 11/2015 | |
| KR | 10-2005-0074820 | A | | 7/2005 | |
| KR | 10-2006-0039712 | A | | 5/2006 | |
| KR | 20-0468708 | Y1 | | 8/2013 | |
| KR | 20160107789 | A | * | 9/2016 | ............ E05B 47/00 |
| KR | 20-0484625 | Y1 | | 10/2017 | |
| KR | 10-2018-0083157 | A | | 7/2018 | |
| KR | 20-2020-0001831 | U | | 8/2020 | |
| WO | WO 01/12931 | A1 | | 2/2001 | |
| WO | WO 2004/059110 | A1 | | 7/2004 | |
| WO | WO 2004/088069 | A1 | | 10/2004 | |
| WO | WO 2007/020623 | A2 | | 2/2007 | |
| WO | WO 2007/065200 | A1 | | 6/2007 | |
| WO | WO 2007/104499 | A2 | | 9/2007 | |
| WO | WO 2012/015135 | A1 | | 2/2012 | |
| WO | WO 2012/116037 | A1 | | 8/2012 | |
| WO | WO 2016/194304 | A1 | | 12/2016 | |
| WO | WO 2017/046399 | A1 | | 3/2017 | |
| WO | WO-2017114534 | A1 | * | 7/2017 | ......... E05B 47/0012 |
| WO | WO 2019/018897 | A1 | | 1/2019 | |
| WO | WO 2019/044962 | A1 | | 3/2019 | |
| WO | WO 2019/071306 | A1 | | 4/2019 | |
| WO | WO 2021/053435 | A1 | | 3/2021 | |
| WO | WO 2021/092660 | A1 | | 5/2021 | |

OTHER PUBLICATIONS

Annotated translation of JP H07197708 A (Year: 1995).*
Machine Translation of FR-2897135-A1 (Year: 2007).*
Machine translation of CN-108506441-A (Year: 2018).*
Annotated Machine translation of WO 2004059110 A1 (Year: 2004).*
International Preliminary Report on Patentability for International Application No. PCT/US2019/065580, mailed Jun. 24, 2021.
PCT/US2019/065580, Mar. 18, 2020, International Search Report and Written Opinion.
International Search Report and Written Opinion for International Application No. PCT/US2019/065580, mailed Mar. 18, 2020.
Examiner's Report; CA Application No. 3,122,099; Mailing Date: Aug. 24, 2023 (4 pgs).

* cited by examiner

DOOR LOCK WITH CLUTCH

BACKGROUND

1. Field of Invention

This invention relates to a door lock or other lock control mechanism that is operable to lock and unlock a door or similar structure.

2. Related Art

Electronic door lock actuators, including so-called smart locks that are used to actuate existing door lock mechanisms, are known, e.g., as described in US Patent Application Publication US20170037937. Such door lock arrangements can allow a user to both operate the door lock manually, e.g., by operating a thumb turn, and electronically, e.g., by interacting with the door lock via an electronic device such as a smartphone.

SUMMARY OF INVENTION

Some door lock arrangements that permit manual operation of the lock require that a user not only rotate or otherwise move the lock mechanism, but also components of a motor drive system such as a motor shaft and drive gears. This can make manual operation of the door lock more difficult than necessary for the user, e.g., because friction in the motor drive system must be overcome by the user to operate the lock. Aspects of the invention provide for a motor drive system for a door lock that includes a clutch which may disengage at least the drive motor from a thumb turn of the door lock so that a user can manually operate the door lock without having to rotate or otherwise move the drive shaft or other portions of a drive motor. Also provided is a position sensing arrangement for determining a position of a lock drive and corresponding lock mechanism that is not dependent on movement of drive train components to determine the position of the lock drive and lock mechanism.

In one aspect of the invention, a door lock includes a body adapted to be mounted to a door or other structure that has a component which can be opened and closed, such as a window. Typically, the body is mounted to a movable part of the door, but may be mountable to a door jamb or other stationary element of the door. A lock drive may be movably mounted to the body and adapted to move a lock mechanism between locked and unlocked positions. The lock mechanism may include a slidable lock bolt, movable latch or other lock element that, when in a locked position, can prevent or otherwise resist movement of the door from a closed position to an open position. The lock drive may be coupled to the lock mechanism to actuate the lock mechanism based on movement of the lock drive. For example, the lock drive may be coupled to the lock mechanism by a tailpiece or other coupling element so that rotation of the lock drive moves the tailpiece and thus the lock mechanism between lock and unlock positions. A thumb turn may be movably mounted to the body and adapted for manual movement between at least two positions, such as open and closed positions. The thumb turn may be coupled to the lock drive such that movement of the thumb turn moves the lock drive, e.g., so that a user can move the thumb turn to move the lock mechanism between lock and unlock positions. While the lock drive can be moved manually via the thumb turn, the lock drive can be moved by a motorized or other automated drive train arrangement. For example, the door lock may include a drive motor mounted to the body arranged to move the lock drive, and a clutch may be mechanically arranged between the drive motor and the lock drive. The clutch may be adapted to selectively couple and uncouple the drive motor from the lock drive based on movement of the drive motor. For example, movement of the drive motor may cause the clutch to couple and/or uncouple the drive motor with respect to the lock drive. Uncoupling of the drive motor from the lock drive may make manual movement of the lock drive easier as discussed above.

In one embodiment, the clutch includes a clutch gear having a pivot axis and that is movably mounted to the body such that the clutch gear can move relative to the body along a two dimensional pathway. For example, the clutch gear may be mounted to the body to be rotatable about the pivot axis and the two dimensional pathway may be arranged in a plane that is perpendicular to the pivot axis. Movement of the clutch gear along the pathway may cause the clutch gear to couple and uncouple the drive motor from the lock drive. In one embodiment, the clutch includes a forward drive gear and a reverse drive gear that are mounted to the body and are coupled to the lock drive. The forward drive gear, reverse drive gear and the two dimensional pathway may be arranged such that the clutch gear engages with the forward drive gear when the pivot axis is located at a first area of the two-dimensional pathway and so that the clutch gear engages with the reverse drive gear when the pivot axis is located at a second area of the two-dimensional pathway. In some cases, rotation of the drive motor in a forward direction moves the clutch gear toward the first area of the two-dimensional pathway, and rotation of the drive motor in a reverse direction moves the clutch gear toward the second area of the two-dimensional pathway. In addition, the pivot axis of the clutch gear may be positionable between the first and second areas such that the clutch gear is disengaged from both the forward drive gear and the reverse drive gear and such that the drive motor is disengaged from the lock drive. Since movement of the drive motor may move the clutch gear, and thus the pivot axis, along the pathway, the drive motor may operate to engage and disengage the clutch gear. In one embodiment, the lock drive includes a drive wheel mounted to the body that is coupled to both the forward and reverse drive gears such that movement of the forward drive gear or the reverse drive gear rotates the drive wheel. The thumb turn may be coupled for movement with the drive wheel such that movement of the thumb turn moves the drive wheel, and movement of the drive wheel moves the thumb turn. As a result, a user may rotate the thumb turn to move the lock drive. A lock tailpiece may be coupled to the drive wheel, e.g., so that the drive wheel is coupled to the lock mechanism.

In another embodiment, the drive train includes the drive motor and a transmission coupled between the drive motor and the clutch. The transmission may include a pair of bevel gears including a first bevel gear mounted to a drive shaft of the drive motor, and a second bevel gear mounted to the body. One or more gears of the transmission may be coupled to the second bevel gear and coupled to an input of the clutch. The input of the clutch may include a clutch gear that is mounted to the body for rotation around a pivot axis of the clutch gear and for movement of the clutch gear in a plane perpendicular to the pivot axis relative to the body.

In another embodiment, the clutch may include a clutch gear that is mounted to the body for rotation around a pivot axis of the clutch gear and for movement relative to the body between an engagement position in which the clutch gear is coupled with the lock drive to move the lock drive and a disengagement position in which the clutch gear is not coupled with the lock drive. The clutch gear may be movable between the engagement and disengagement positions by the drive motor, e.g., rotating the clutch gear.

In another aspect of the invention, a door lock may include a body adapted to be mounted to a door or other structure, a lock drive movably mounted to the body and adapted to move a lock mechanism between locked and unlocked positions, and a thumb turn movably mounted to the body and adapted for manual movement between at least two positions. The thumb turn may be coupled to the lock drive such that movement of the thumb turn moves the lock drive, i.e., to move the lock mechanism. A drive motor may be mounted to the body, and a clutch may be mechanically arranged between the drive motor and the lock drive. The clutch may have a clutch gear that is movable relative to the body between engaged and disengaged positions to selectively couple and uncouple the drive motor from the lock drive. In some embodiments, the drive motor may move the clutch gear between engaged and disengaged positions, while in other embodiments the clutch gear may be moved in other ways, such as by an actuator.

In one embodiment, when in the engaged position, the clutch gear is engaged with a drive gear that is coupled to the lock drive such that rotation of the drive gear rotates the lock drive, and in the disengaged position, the clutch gear is disengaged from the drive gear. The clutch gear may have a pivot axis movably mounted to the body such that the clutch gear can move relative to the body along a two dimensional pathway between the engaged and disengaged positions, e.g., under the force of an actuator such as a solenoid. In one case, the drive gear is a forward drive gear and the engaged position is a forward engaged position such that rotation of the forward drive gear rotates the lock drive in a forward direction. The door lock may also include a reverse drive gear that is coupled to the lock drive such that rotation of the reverse drive gear rotates the lock drive in a reverse direction. The clutch gear may be movable between the forward engaged position and a rearward engaged position in which the clutch gear is engaged with the reverse drive gear, and a disengaged position of the clutch gear may be located between the forward engaged position and the rearward engaged position. In some cases, rotation of the drive motor in a forward direction moves the clutch gear along the two dimensional pathway toward the forward engaged position, and rotation of the drive motor in a reverse direction moves the clutch gear along the two dimensional pathway toward the rearward engaged position.

As noted above, a transmission or other drive train components may be included with the drive motor, and the clutch may be adapted to selectively engage and disengage portions of the drive train from the lock drive. The transmission may include a pair of bevel gears including a first bevel gear mounted to a drive shaft of the drive motor, and a second bevel gear mounted to the body. The lock drive may include a drive wheel mounted to the body that is couplable to the clutch gear such that rotation of the clutch gear rotates the drive wheel. A lock tailpiece may be coupled to the drive wheel.

Other advantages and novel features of the invention will become apparent from the following detailed description of various non-limiting embodiments when considered in conjunction with the accompanying figures and claims.

BRIEF DESCRIPTION OF THE DRAWINGS

Aspects of the invention are described with reference to the following drawings in which numerals reference like elements, and wherein.

DETAILED DESCRIPTION

Aspects of the invention are described below by way of one or more illustrative embodiments. It should be understood that the illustrative embodiments described are not intended to limit the aspects of the invention, but rather to help show how one or more aspects of the invention may be implemented in a particular example. Also, aspects of the invention may be implemented alone and/or in combination with other aspects of the invention. For example, a clutch arrangement is described below in which the clutch can be engaged/disengaged based on motor movement. This aspect of the invention may be employed with an aspect of the invention that a clutch gear can be moved along a two dimensional path to engage/disengage the clutch gear, or can be used with other clutch configurations. As another example, the aspect of the invention that a clutch gear can be moved along a two dimensional path can be used with an arrangement that employs an actuator to move the clutch gear along the two dimensional path, or in other arrangements such as those that allow a user to manually move the clutch gear along the path.

Figure 1:
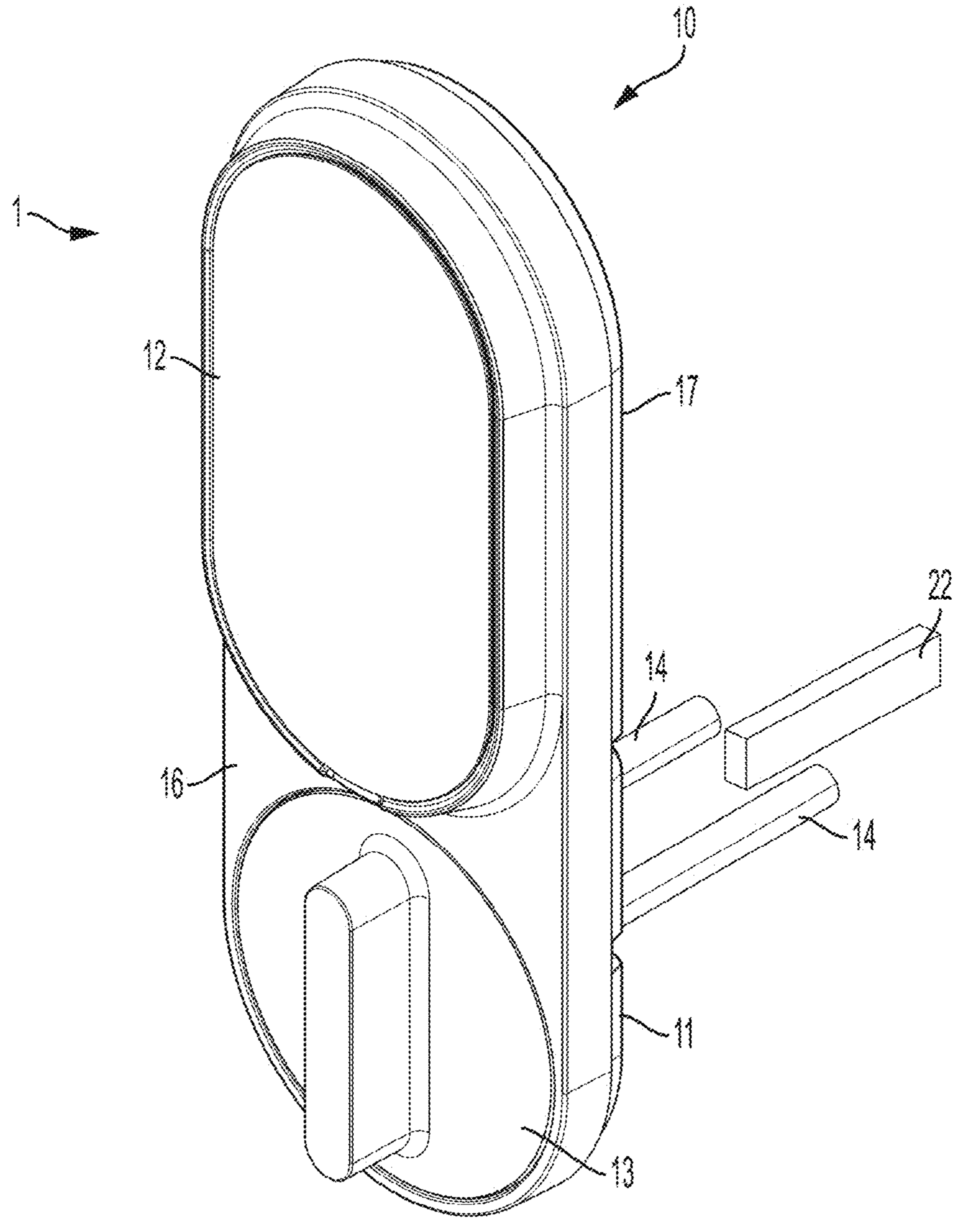
FIG. 1 is a front perspective view of a door lock in an illustrative embodiment.

FIG. 1 shows a perspective view of an illustrative door lock 1 that incorporates one or more aspects of the invention and can be used to move an existing door lock mechanism, such as a sliding bolt or latch, between lock and unlock positions. Embodiments below are described in connection with a door lock mechanism that includes a dead bolt-type lock mechanism in which a bolt element is extended from/retracted into a door structure to lock/unlock the door. However, the door lock 1 may be used with other types of lock mechanisms. In this embodiment, the door lock 1 has a body 10 including a mounting plate 11, a base 17 and a cover plate 16. The mounting plate 11 may be mounted to a door or other surface to which the door lock 1 is to be attached, and thereafter the base 17 and cover plate 16 may be attached to the mounting plate 11 to assemble the door lock 1 on the door. For example, the mounting plate 11 may have one or more mounting pins 14 that are extended into an opening in a door from an inner side of the door and are secured to a lock cylinder assembly (not shown) on an outer side of the door by screws that engage with the mounting pins 14. Such lock cylinder assemblies are well known in the art and allow a user, for example, to operate the door lock mechanism using a key. In other arrangements, the mounting plate 11 may be mounted over an existing thumb turn of a lock installed on a door. As an example, screws that secure the existing thumb turn of the installed lock may be used to secure the mounting plate 11 to the door. With the mounting plate 11 secured to the door or other structure, the base 17 and cover plate 16 may be positioned over and attached to the mounting plate 11. In this embodiment, the base 17 includes latches 15 that are pivotally mounted to the base 17 and have levers that can be swung outwardly away from the base 17 to allow the base 17 to be positioned over the mounting plate 11. Thereafter, the latches 15 may be pivoted inwardly so that the latches 15 engage corresponding portions of the mounting plate 11, thereby fixing the base 17 to the mounting plate 11. This arrangement can allow for relatively easy and tool-free engagement of the base 17 with the mounting plate 11. Of course, other options are possible to attach the door lock body 10 to a door, including the use of screws or other fasteners to secure the base 17 and cover plate 16 to the mounting plate 11. In yet other embodiments, a separable mounting plate 11 need not be used at all. Instead, the base 17 may be attached directly to the door by way of mounting pins 14, attached over an existing thumb turn using existing thumb turn screws, or in other ways. Attaching the door lock body 10 over an existing lock thumb turn may make for easier installation, e.g., because portions of an existing lock need not be removed.

As is common with many fully manual door locks, the door lock 1 includes a thumb turn 13 that allows a user to manually rotate or otherwise actuate the lock mechanism to move a bolt, latch or other lock element between lock and unlock positions. In this embodiment, the thumb turn 13 may be coupled with a lock tailpiece 22 (either pre-existing or provided with the door lock 1) so that the thumb turn 13 can rotate the tailpiece 22, and thereby move the lock mechanism between lock and unlock positions. Use of a lock tailpiece 22 with the door lock 1 will typically be done when a thumb turn of an existing lock is removed and the door lock 1 is mounted in its place. Where the door lock 1 is mounted over an existing lock thumb turn, the thumb turn 13 of the door lock 1 may be coupled with the existing lock thumb turn, e.g., by providing the door lock 1 with a coupling device that fits over and has a recess to receive the existing thumb turn, as discussed more below.

Figure 2:
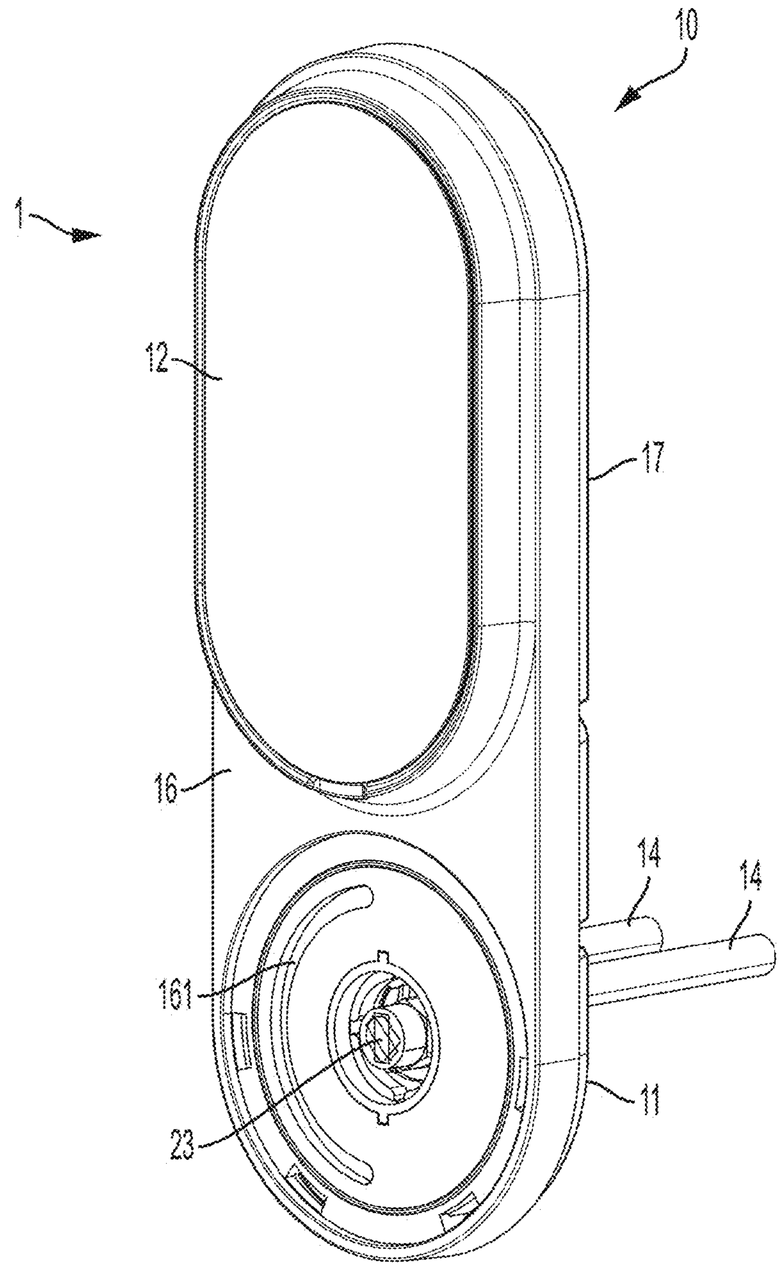
FIG. 2 is a front perspective view of the FIG. 1 door lock with the thumb turn removed.
Figure 3:
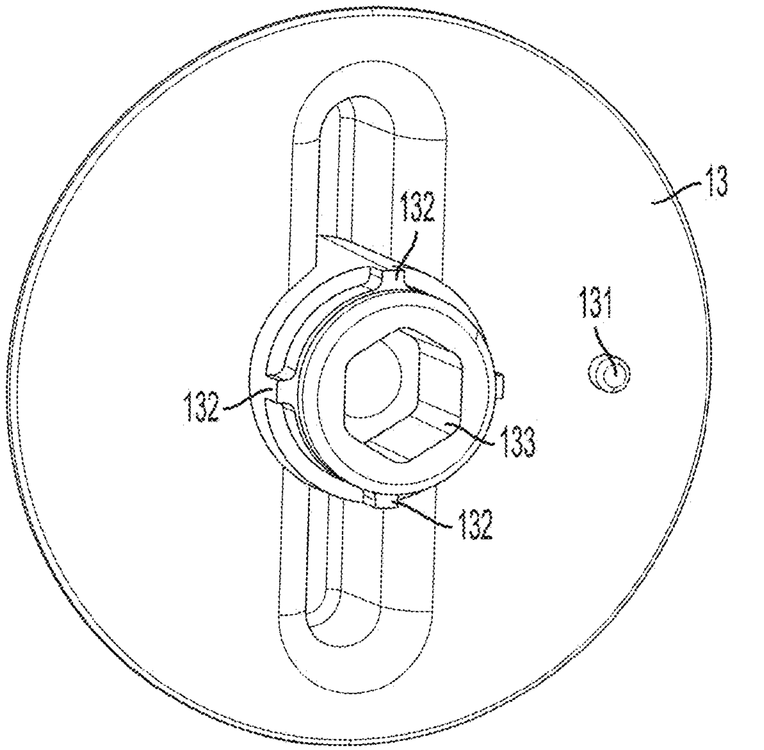
FIG. 3 is a rear perspective view of the thumb turn of the FIG. 1 embodiment.

FIG. 2 shows a view of the door lock 1 with the thumb turn 13 removed. Normally, the thumb turn 13 is mounted to the cover plate 16, but the thumb turn 13 is shown removed in FIG. 2 to illustrate that the range of motion of the thumb turn 13 may be limited. For example, the cover plate 16 may have a recess in which the thumb turn 13 is received when engaged to the cover plate 16. An arcuate slot 161 may be included in the recess and engage with a portion of the thumb turn 13 so that the thumb turn 13 can only be rotated relative to the cover plate 16 to an extent permitted by the slot 161. For example, FIG. 3 shows a rear perspective view of the thumb turn 13 and illustrates a pin 131 that is received in the slot 161. When the thumb turn 13 is mounted to the cover plate 16, the pin 131 moves in the slot 161 as the thumb turn 13 is rotated to actuate the lock mechanism between lock and unlock positions. However, the pin 131 and slot 161 limit the range of motion of the thumb turn 13 relative to the cover plate 16, e.g., in this case to about 180 degrees rotation. Such limitation is not required, however, and the thumb turn 13 need not be limited in its movement relative to the body 10. Alternately, the thumb turn 13 may be limited to a range of motion that is less than 180 degrees, e.g., 90 degrees or less.

Figure 4:
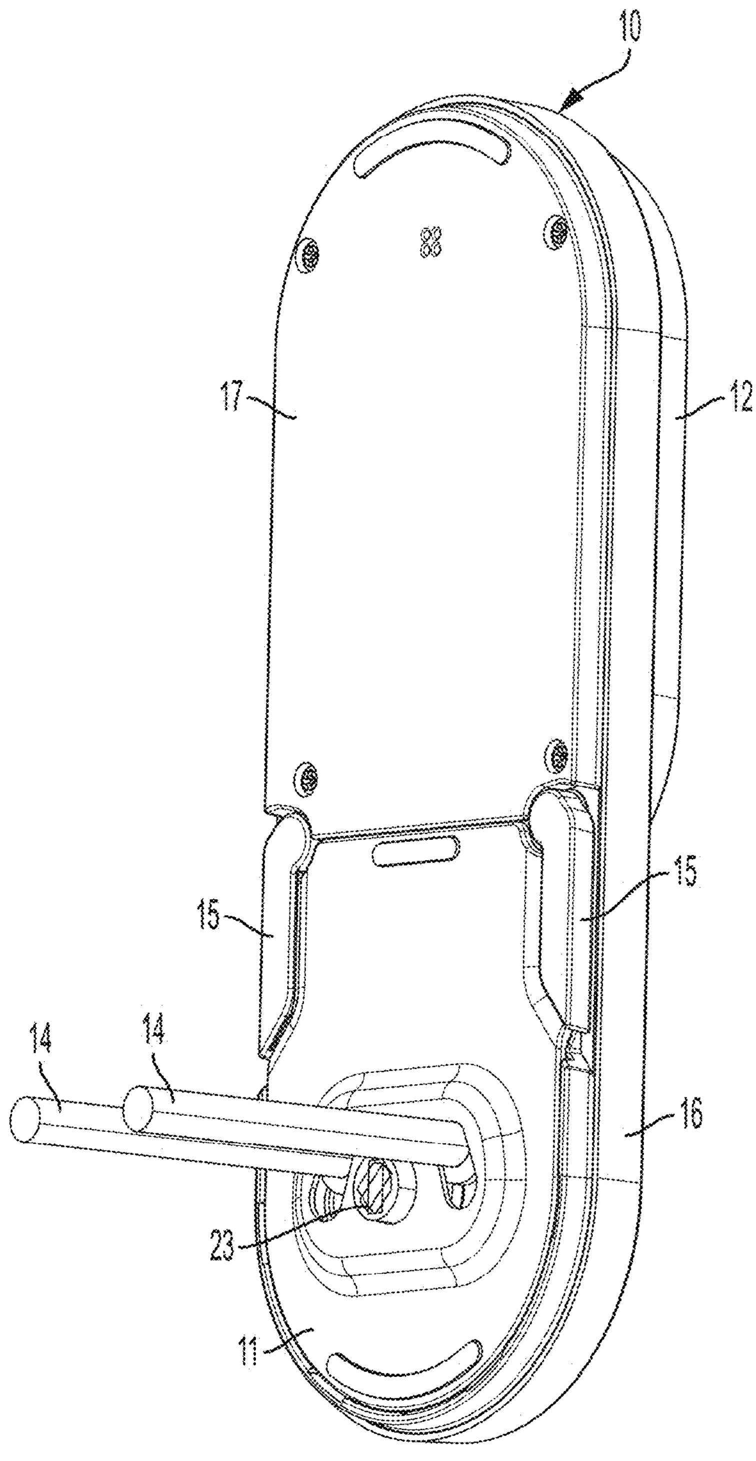
FIG. 4 is a rear perspective view of the FIG. 1 embodiment.

FIG. 4 shows a rear perspective view of the door lock 1, and illustrates how the latches 15 may be pivoted inwardly so as to be received by corresponding recesses in the mounting plate 11 to secure the base 17 and cover plate 16 to the mounting plate 11. FIG. 4 also shows a tailpiece receiver 23 that is coupled to the thumb turn 13 and may receive the tailpiece 22 shown in FIG. 1. In this embodiment, the tailpiece receiver 23 engages with a tailpiece coupling 133 at the rear of the thumb turn 13, as can be seen in FIG. 3. This couples the thumb turn 13 and the tailpiece receiver 23 so that rotation of the thumb turn 13 rotates the tailpiece receiver 23. In this embodiment, the tailpiece coupling 133 includes a hexagonal opening that receives a hexagonal portion of the tailpiece receiver 23 to rotationally fix the tailpiece receiver 23 with respect to the thumb turn 13. Of course other arrangements are possible. For example, the tailpiece receiver 23 may be made integrally with or otherwise attached to the thumb turn 13 and need not necessarily be made separable from the thumb turn 13. As will be understood, the tailpiece receiver 23 may be arranged to accept differently sized and/or shaped tailpieces 22 so that the door lock 1 can be used with different lock mechanisms. The tailpiece receiver 23 may be made replaceable and/or adaptable to allow for a desired range of different tailpiece or other lock mechanism engagement parts. Also, where the door lock 1 is mounted over an existing lock thumb turn, the tailpiece receiver 23 may be arranged to couple with the exiting thumb turn. For example, the tailpiece receiver 23 may be arranged with a suitably sized and shaped recess to fit over the existing thumb turn and rotate the existing thumb turn based on rotation of the thumb turn 13.

Figure 5:
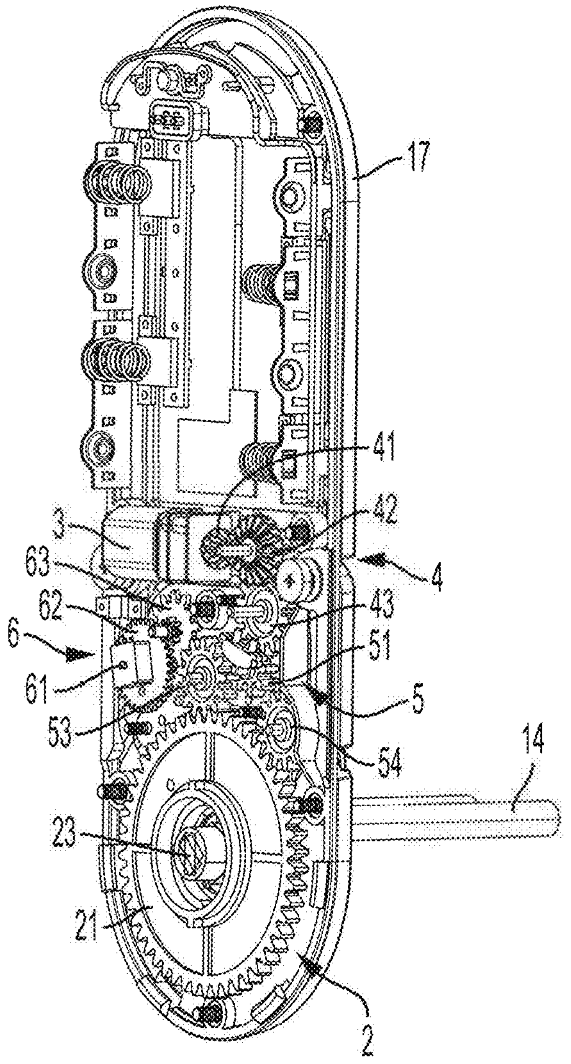
FIG. 5 is a front perspective view of the FIG. 1 embodiment with the cover plate removed.
Figure 6:
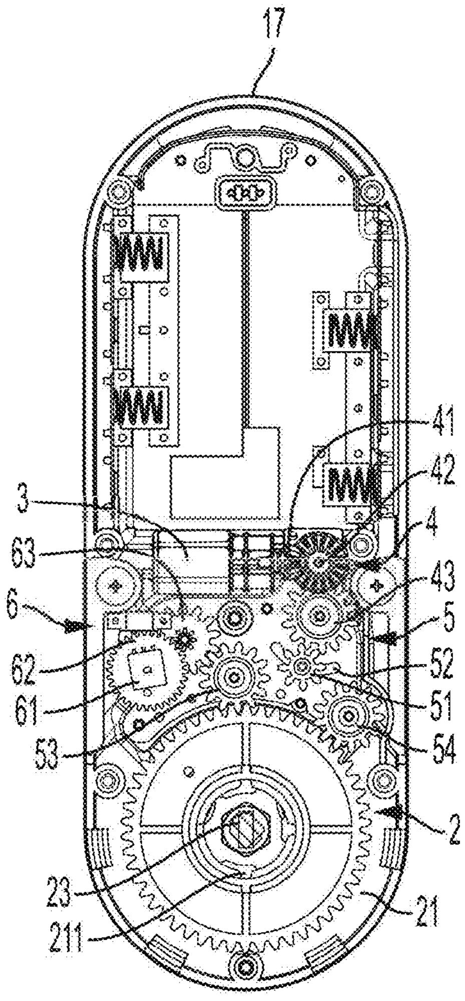
FIG. 6 shows a front view of the FIG. 1 embodiment with the cover plate removed.

While the door lock 1 in this embodiment allows a user to manually move a lock mechanism between lock and unlock positions using the thumb turn 13, the door lock 1 also includes a drive train with a motor drive function that allows the lock mechanism to be moved automatically between lock and unlock positions, e.g., in response to wireless signals from a user device such as a smartphone. FIGS. 5 and 6 show the door lock 1 with the cover plate 16 removed to illustrate a motor drive arrangement to rotate the tailpiece receiver 23 or other component that engages with a lock mechanism to move the lock mechanism between lock and unlock positions. In this embodiment, a lock drive 2 is provided to drive rotation of the tailpiece 22, an existing thumb turn, or other lock mechanism engagement part. The lock drive 2 includes the tail piece receiver 23 and a drive wheel 21 that is rotatably mounted to the cover plate 16. The drive wheel 21 is coupled to the tailpiece receiver 23 via the thumb turn 13, although other arrangements are possible, such as attaching the tailpiece receiver 23 directly to the drive wheel 21. To rotatably couple the thumb turn 13 and drive wheel 21, the drive wheel 21 includes an opening with slots 211 that are arranged to receive corresponding splines 132 on a rear side of the thumb turn 13 (see FIG. 3 which illustrates the splines 132 on the thumb turn 13). With the splines 132 received in the corresponding slots 211 of the drive wheel 21, the drive wheel 21 and thumb turn 13 are rotatably coupled such that rotation of the thumb turn 13 rotates the drive wheel 21, and rotation of the drive wheel 21 rotates the thumb turn 13. With the tailpiece receiver 23 engaged with the tailpiece coupling 133 of the thumb turn 13, the tailpiece receiver 23 is coupled to the drive wheel 21 as well. Since the thumb turn 13 is positioned on an outer side of the cover plate 16, and the drive wheel 21 is positioned on an inner side of the cover plate 16, coupling of the thumb turn 13 to the drive wheel 21 mounts the two components to the cover plate 16. More specifically, the portion of the thumb turn 13 that includes the splines 132 extends through an opening in the cover plate 16 and into the opening of the drive wheel 21 to engage the splines 132 with the slots 211. A spring clip 135 (see FIG. 8) secures the thumb turn 13 to the drive wheel 21 in an axial direction.

As mentioned above, the door lock 1 in this embodiment includes a drive train to move the lock drive 2, and thus a coupled tailpiece 22 and lock mechanism, between lock and unlock positions. In some cases, a motor drive of a drive train can make manual rotation of a thumb turn 13 difficult, e.g., because of friction in a motor drive train. However, in accordance with an aspect of the invention, a clutch 5 is provided to selectively decouple a drive motor 3 from the lock drive 2 to allow for easier rotation of the thumb turn 13. In this embodiment, the drive motor 3 is arranged to rotate the lock drive 2 by way of a transmission 4, and the clutch 5 can decouple the transmission 4 from the lock drive 2 as well. This can allow for easier turning of the thumb turn 13 by a user, e.g., because the drive motor 3 and transmission 4 need not be rotated when the thumb turn 13 is rotated by hand. Although the transmission 4 can be arranged in a variety of different ways, in this embodiment the transmission 4 includes a first bevel gear 41 that is mounted to the drive shaft of the motor 3, and a second bevel gear 42 that is coupled to the first bevel gear 41. The second bevel gear 42 is coupled to an idler gear 43. In this embodiment, the clutch 5 includes a clutch gear 51 that is engaged with the idler gear 43, and forward and reverse drive gears 54, 53 that are engaged with gear teeth on the drive wheel 21. As is discussed in more detail below, the clutch gear 51 can move along a two dimensional pathway 52, e.g., a slot 52 formed in the base 17. Movement along the two dimensional pathway 52 allows the clutch gear 51 to be selectively engaged with either the forward drive gear 54 or the reverse drive gear 53, or disengaged from both gears 54, 53.

Figure 7:
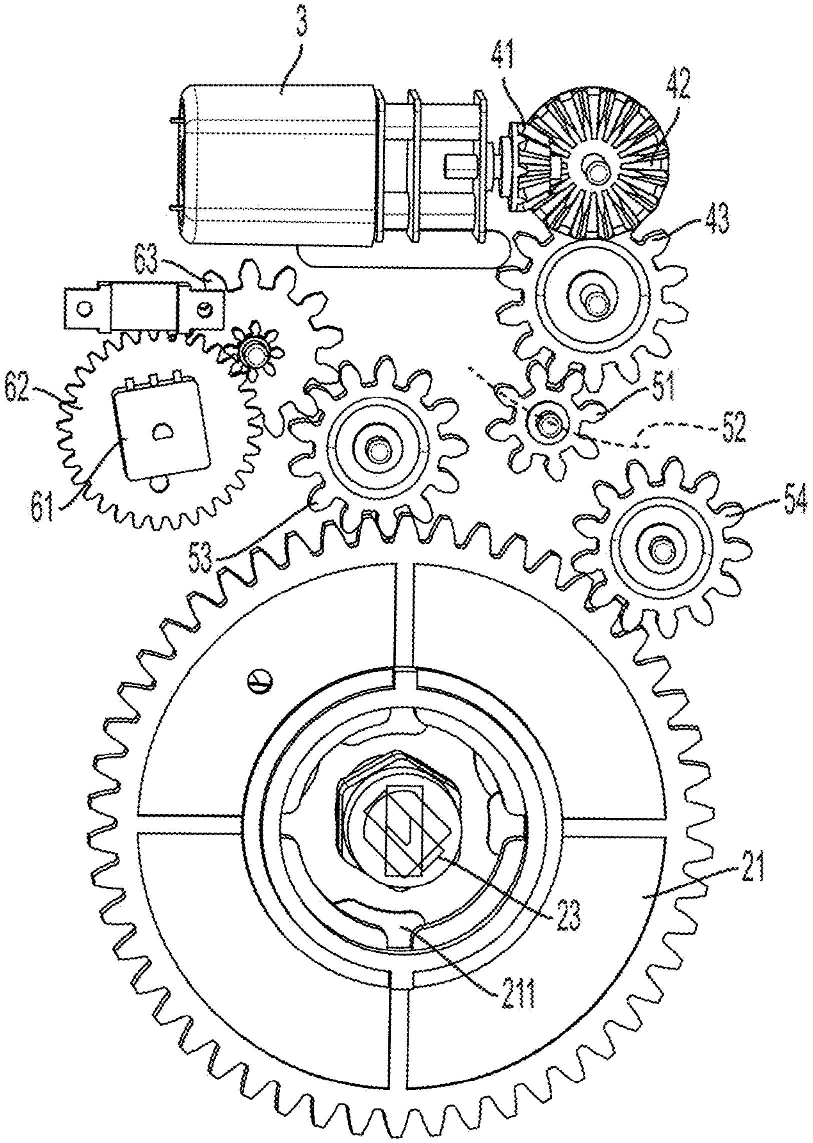
FIG. 7 is a front view of the drive motor, transmission, clutch and lock drive of the FIG. 1 embodiment.
Figure 8:
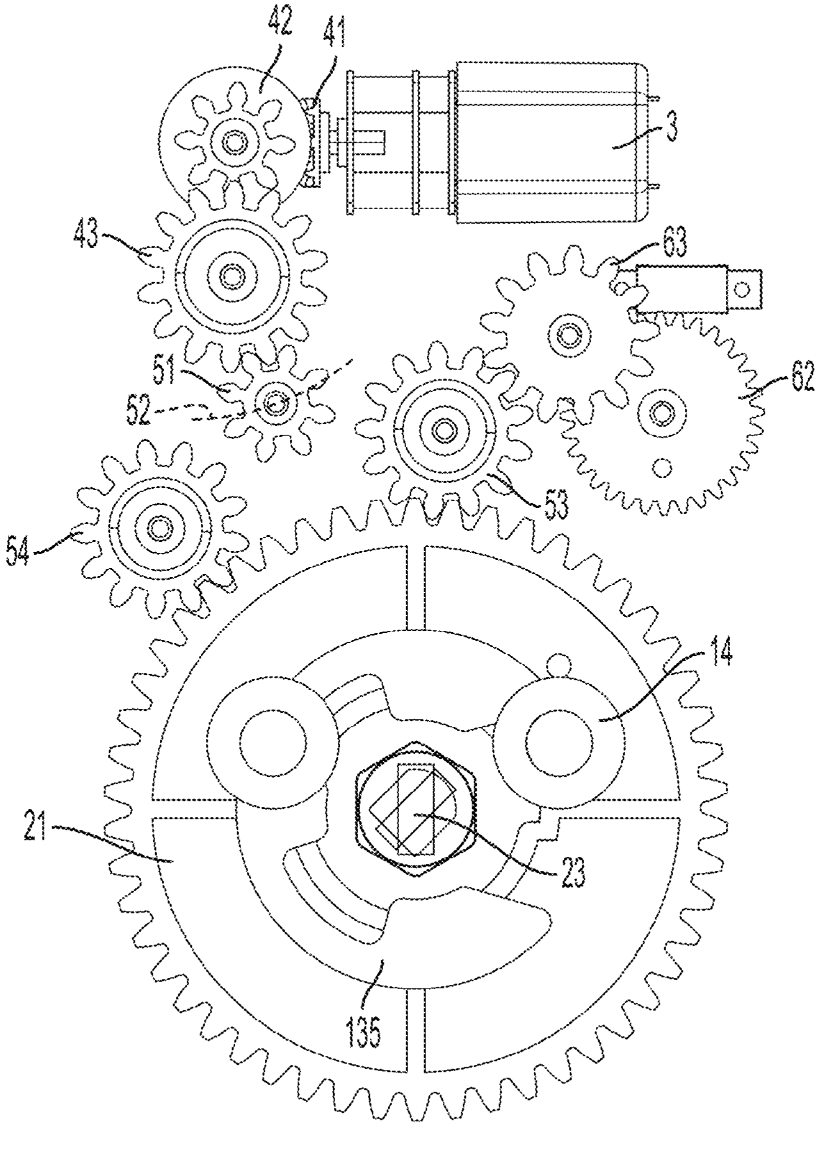
FIG. 8 is rear view of the drive motor, transmission, clutch and lock drive of the FIG. 1 embodiment.

In accordance with an aspect of the invention, the clutch 5 can selectively engage and disengage from the lock drive 2 based on movement of the drive motor 3. FIGS. 7 and 8 show front and rear views of the lock drive 2, the motor 3, the transmission 4 and the clutch 5 without the supporting base 17 or other components so that operation of the clutch 5 can be more easily understood. When the drive motor 3 rotates in a forward direction, the bevel gears 41, 42 and idler gear 43 rotate the clutch gear 51 in a clockwise direction as viewed from the front in FIG. 7. (The terms forward and reverse are used herein as an aid to understanding, but should not be ascribed any particular meaning other than rotating in different directions.) This action by the idler gear 43 on the clutch gear 51 not only rotates the clutch gear 51 about its pivot axis (i.e., an axis perpendicular to the image in FIG. 7) but also moves the clutch gear 51 along the pathway 52 toward the forward drive gear 54 so that the clutch gear 51 engages with the forward drive gear 54. Rotation of the drive motor 3 in the reverse direction, rotates the clutch gear 51 in a counterclockwise direction and moves the clutch gear 51 along the pathway 52 toward the reverse drive gear 53 so the clutch gear 51 engages with the reverse drive gear 53. Thus, the clutch gear 51 is mounted to the base 17 so that the clutch gear 51 can move along an arcuate, two-dimensional pathway 52 (formed by a slot in the base 17 in this embodiment) between a first area where the clutch gear 51 engages with the forward drive gear 54 and a second area where the clutch gear 51 is engaged with the reverse drive gear 53. The clutch gear 51 can also be positioned along the pathway 52 between the first and second areas—a disengagement area—where the clutch gear 51 is not engaged with either of the drive gears 54, 53. Movement of the clutch gear 51 along the pathway 52 between engagement and disengagement positions is based on movement of the drive motor 3, thereby eliminating the need for any separate clutch engagement/disengagement actuator, such as a solenoid, in at least some embodiments. That is, forward rotation of the motor 3 causes the clutch gear 51 to move along the pathway 52 toward the forward drive gear 54, and reverse rotation of the motor 3 causes the clutch gear 51 to move along the pathway 52 toward the reverse drive gear 53. As a result, the clutch gear 51 can be selectively moved to engagement positions with the drive gears 54, 53 by suitably rotating the drive motor 3. Moreover, the motor 3 can be controlled to move the clutch gear 51 to a disengaged position along the pathway 52 where the clutch gear 51 is not engaged with either gear 54, 53. What this means is that movement of the motor 3 alone can control whether the clutch gear 51 is engaged with a drive gear 54, 53 or not. For example, if the clutch gear 51 is in an engaged position (whether engaged with the forward or reverse drive gear 54, 53), the motor 3 may be rotated a particular number of revolutions or partial revolutions to move the clutch gear 51 from the engaged position to a disengaged position.

Control of the drive motor 3 to position the clutch gear 51 in a disengaged position may be done in a variety of different ways. In some embodiments, the motor 3 may be operated to move the clutch gear 51 to a disengaged position after each time the drive motor 3 is used to move the lock drive 2. For example, the motor 3 may be rotated in the forward direction to move the lock drive 2 and a coupled lock mechanism to a lock position. Upon arrival of the lock drive 21 at the lock position, the motor 3 may be driven in the rearward direction sufficiently to disengage the clutch gear 51 from the forward drive gear 54. To effect disengagement of the clutch gear 51, the motor 3 may be energized for a period of time in the reverse direction to disengage the clutch gear 51 from the forward drive gear 54. In other embodiments, the motor 3 may be a stepper motor or motor with a position sensing capability so that the motor 3 can be driven a particular number of full or partial revolutions to achieve clutch gear disengagement. In other cases, a sensor may be employed to detect when the clutch gear 51 is at a disengaged position and the motor 3 stopped to leave the clutch gear 51 at the disengaged position. Similar is true for movement of the lock drive 2 in the reverse direction. That is, the clutch gear 51 can be moved from a position in which the clutch gear 51 is engaged with the reverse drive gear 53 to a disengaged position along the pathway 52 in similar ways, e.g., the motor 3 moved in a rearward direction until the lock drive 2 is suitably positioned, and then the motor 3 reverses direction to move the clutch gear 51 to a disengaged position. By having the clutch gear 51 in a disengaged position after each time the motor drive is used to move the lock drive, a user may be able to manually move the thumb turn 13 without having the thumb turn 13 engaged with the motor 3.

In another aspect of the invention, the clutch may include a gear that moves between engaged and disengaged positions, and such movement may be independent of motor movement. For example, the clutch gear 51 in the embodiments of FIGS. 5-8 may be moved along the pathway 52 between engaged and disengaged positions independently of motor 3 movement. In one embodiment, an actuator such as a linear motor or solenoid may be used to move the clutch gear 51 along the pathway 52 as desired. In another arrangement, a user may be able to move the clutch gear 51 along the pathway 52, such as by a finger-actuated slider by which a user can move the clutch gear 51 by hand between desired engagement or disengagement positions. In one embodiment, the clutch gear 51 may be biased by a spring or other resilient element toward an engaged position with a drive gear. A finger-actuated release element may be provided by which a user can press a button or other actuator so as to release the spring bias and move the clutch gear 51 to a disengaged position. This may allow a user to temporarily release the clutch so the user can easily turn the thumb turn 13, e.g., in an emergency situation or failure of a power supply 12 of the door lock 1. Upon release by the user, the clutch gear 51 may again be biased to the engagement position. Note that the clutch 5 need not include forward and reverse drive gears 54, 53, but instead may include only one drive gear, such as the forward drive gear 54. The clutch gear 51 may be engaged with the forward drive gear 54 to move the drive wheel in both forward and reverse directions, and may be disengaged from the drive gear 54 to allow for easier turning of the thumb turn 13. An actuator, user operated element or other structure may be used to maintain the clutch gear 51 at the engaged and/or disengaged positions.

In another aspect of the invention, the door lock may include a position sensor that can determine a position of the lock drive independent of movement of a transmission or motor that operates to move the lock drive. As an example, a position sensor may be coupled to the lock drive at a location of the system such that a clutch is positioned between the position sensor and the motor and transmission. Such an arrangement may allow the door lock to detect position of the lock drive whether the lock drive is moved by a motor or by hand because the clutch can disengage the motor from the lock drive, and yet the position sensor can determine the lock drive position. This is in contrast to arrangements that have a position sensor integrated with a motor, transmission or other drive train component that automatically moves the lock drive. Such systems must have the transmission or other motor drive components remain coupled to the lock drive because otherwise the position sensor will not be able to continuously track the position of the lock drive. As a result, such systems cannot have a clutch that enables disengagement of the motor from the lock drive.

In another aspect of the invention, a position sensor may be mounted to a gear that is not part of a drive train that functions to move the lock drive. For example, a position sensor may be mounted to a gear that does not function to transmit energy to move the lock drive, but instead moves passively based on movement of the lock drive. This may allow the position sensor to be isolated from stresses and other physical disruptions that may be experienced by a gear or other drive train component that transmits energy to move the lock drive. As a result, the position sensor may operate more reliably and provide a position signal that is not influenced by mechanical disruptions.

In another aspect of the invention, a position sensor may be arranged to determine position of a lock drive in a way that is independent of motion of drive train components that are operating to move the lock drive. This may allow the position sensor to not only be isolated from mechanical disruptions experienced by drive train components during movement of the lock drive, but also allow the position sensor to identify failure or other faults of the drive train. For example, since the position sensor may be responsive to movement of an element (such as a gear) that moves passively in response to movement of the lock drive rather than components of the drive train, the position sensor may indicate only movement of the lock drive. If the drive train has failed, the lock drive will not move and will be detected by the position sensor. This is in contrast to systems which have a position sensor detect motion responsive to movement of a drive train component. In some of those cases, a drive train component associated with the position sensor may move and thereby move the position sensor, but the lock drive will not move because of failure of another drive train component that is downstream. By arranging the position sensor to determine position of a lock drive independent of motion of drive train components operating to move the lock drive, such drive train failure can be detected by the position sensor.

FIGS. 7 and 8 show a position sensor 61 that is mounted to a position gear 62 that is not a drive train component and that can detect movement of the lock drive 2, e.g., the drive wheel 21. Moreover, the position sensor 61 can detect position of the drive wheel 1 independently of movement of the motor 3 and transmission 4. For example, if the clutch 5 disengages the motor 3 and transmission 4 from the drive wheel 21, the position gear 62 and position sensor 61 will still move in response to movement of the drive wheel 21. This is because the position gear 62 is directly coupled to the intermediate gear 63 which is directly coupled to the reverse drive gear 53, which is directly coupled to the drive wheel 21. Thus, movement of the drive wheel 21 will move the position gear 62 and the position sensor 61, even if the drive motor 3 and transmission 4 do not move at all. This allows the position sensor 61 to track movement of the drive wheel 21 whether the clutch 5 is engaged or not. Also, although the position gear 62 is moved at least indirectly by the reverse drive gear 53, the position gear 62 is not itself subjected to the stress of moving the drive wheel 21 because the position gear 62 moves passively based on movement of the reverse drive gear 53. This can allow the position gear 62 to be made less robustly than otherwise required, and make the position gear 62 more responsive to movement of the drive wheel 21.

Although the position gear 62 is coupled to the drive wheel 21 via the reverse drive gear 53 in the FIGS. 5-8 embodiment, the position gear 62 is not itself a drive train component and at least in some modes of operation, the reverse drive gear 53 is not part of drive train that moves the drive wheel 21 either. Thus, in at least some modes of operation, the position sensor 61 can detect position of the drive wheel 21 independent of movement of any drive train component that is operating to move the drive wheel 21. For example, when the clutch gear 51 is not engaged with the reverse drive gear 53, the reverse drive gear 53 is not part of the drive train that moves the drive wheel 21, and instead is a passive element. Accordingly, when the clutch gear 51 is in the disengaged or forward engaged position, the reverse drive gear 53 is not subjected to stresses of moving the drive wheel 21 and instead is moved by the drive wheel 21. This can make the reverse drive gear 53 more responsive to movement of the drive wheel 21 and provide a more accurate indication of the position of the drive wheel 21 than if the reverse drive gear 53 was moved by the clutch gear 51. For example, during phases when the reverse drive gear 53 is moved by the clutch gear 51, the reverse drive gear 53 does not necessarily provide accurate feedback regarding position of the drive wheel 21, e.g., the reverse drive gear 53 may have disengaged from the drive wheel 21 and yet still move the position gear 62. However, when the reverse drive gear 53 is not driven by the clutch gear 51, movement of the reverse drive gear 53 is based on movement of the drive wheel 21 only. This allows the position sensor 61 to provide accurate information regarding drive wheel 21 position and/or failure of the motor 3, transmission 4 and/or clutch 5 at least when the clutch gear 51 is in a disengaged position or forward engaged position.

Although the position gear 62 is coupled to the drive wheel 21 via the intermediate gear 63 and the reverse drive gear 53 in this embodiment, the position gear 62 can be directly coupled to the drive wheel 21, or the intermediate gear 63 can be directly coupled to the drive wheel 21. This would make movement of the position sensor 61 completely independent of any drive train component. Therefore, in some embodiments, a position sensor for determining the position of the lock drive may be mounted to a gear that is coupled to the lock drive, but whose movement is not based on movement of any drive train component used to move the lock drive. Such an arrangement can provide resilience to failure, such as when a position sensor is coupled to a drive component. For example, drive gears may have relatively high torques applied to them, and as a result the drive gears may break or "skip" where toothed engagement between adjacent gears temporarily disengages. By having a position sensor on a gear that is not part of a drive train, the position sensor will not be subjected to high torques, skipping or other problems experienced by components of the drive train. Also, such arrangement may allow for repair or replacement of the position sensor without disrupting components of the drive train. Thus, repair or replacement of a faulty position sensor may be performed more easily.

In some embodiments, the reverse drive gear 53 may be used only to move the drive wheel 21 when the lock mechanism is being moved from a lock to an unlocked position. This may put less stress on the reverse drive gear 53 than is put on the forward drive gear 54, e.g., because movement of the lock mechanism from the lock position to the unlock position may require less torque. As an example, movement of a bolt of a lock mechanism from an unlock position (where the bolt is retracted into a door) to a lock position (where the bolt is extended from the door and into a corresponding receiving opening of a door jamb) may be prevented or resisted in some cases such as when a door is not fully closed. This may put high stress on the motor drive system, including the forward drive gear 54, when the bolt of the lock mechanism is physically prevented from moving. However, movement of the lock mechanism from a lock position to an unlock position may typically put less stress on the drive system, and thus on the reverse drive gear 53. This may allow the position sensor 61 to provide more accurate position information, e.g., because the reverse drive gear 53 may be subjected to fewer conditions in which the reverse drive gear 53 may disengage from the drive wheel 21. As a result, the position sensor 61 may be coupled to a component of the drive train that is subjected to lower torques or other forces when moving the lock drive 2.

Electronic control of the door lock 1 components, such as the motor 3 and communication with the position sensor 61, may be performed by any suitable control circuitry, which may include a programmed general purpose computer and/or other data processing device along with suitable software or other operating instructions, one or more memories (including non-transient storage media that may store software and/or other operating instructions), a power supply for the control circuitry and/or other system components, position and other sensors, wireless communication devices to allow the control circuitry to receive and send signals with respect to user devices such as a smartphone or wireless router, input/output interfaces (e.g., such as the user interface to display information to a user and/or receive input from a user), communication buses or other links between components of the door lock 1, a display, switches, relays, triacs, motors, mechanical linkages and/or actuators, or other components necessary to perform desired input/output or other functions.

While aspects of the invention have been described with reference to various illustrative embodiments, such aspects are not limited to the embodiments described. Thus, it is evident that many alternatives, modifications, and variations of the embodiments described will be apparent to those skilled in the art. Accordingly, embodiments as set forth herein are intended to be illustrative, not limiting. Various changes may be made without departing from the spirit of aspects of the invention.

The invention claimed is:

1. A door lock comprising:

a body adapted to be mounted to a door and having a base, wherein the base has a curved slot formed therein;

a lock drive movably mounted to the base of the body and adapted to move a lock mechanism between locked and unlocked positions;

a thumb turn movably mounted to the body and adapted for manual movement between at least two positions, the thumb turn being coupled to the lock drive such that movement of the thumb turn moves the lock drive;

a drive motor mounted to the base of the body;

a clutch gear having a pivot axis, the clutch gear being mounted in the curved slot of the base, wherein:

the clutch gear is configured for displacement along the curved slot between an engaged position in which the clutch gear is coupled with the lock drive and a disengaged position in which the clutch gear is not coupled with the lock drive, the clutch gear is configured for rotation about the pivot axis, the clutch gear is operably coupled with the drive motor such that movement of the drive motor effects rotation of the clutch gear about the pivot axis, and the rotation of the clutch gear about the pivot axis effects displacement of the clutch gear along the curved slot to selectively couple or uncouple the drive motor to or from the lock drive in response to movement of the drive motor to rotate the clutch gear; and a forward drive gear and a reverse drive gear that are mounted to the body and coupled to the lock drive, wherein the curved slot has a first position where positioning the pivot axis of the clutch gear causes the clutch gear to engage with the forward drive gear, wherein the curved slot has a second position where positioning the pivot axis of the clutch gear causes the clutch gear to engage with the reverse drive gear, and wherein when the drive motor is energized for a predetermined interval of time the clutch gear is displaced between the engaged position and the disengaged position.

2. The door lock of claim 1, wherein the clutch gear is operably coupled with the drive motor by a drive gear and the clutch gear is configured for displacement along the curved slot by reaction forces arising from interactions between the clutch gear, the drive gear and the curved slot.

3. The door lock of claim 2, wherein the curved slot is arranged in a plane that is perpendicular to the pivot axis.

4. The door lock of claim 1, wherein rotation of the drive motor in a forward direction displaces the clutch gear toward the first position of the curved slot, and rotation of the drive motor in a reverse direction displaces the clutch gear toward the second position of the curved slot.

5. The door lock of claim 1, wherein the pivot axis of the clutch gear is positionable between the first position and the second position such that the clutch gear is disengaged from both the forward drive gear and the reverse drive gear and such that the drive motor is uncoupled from the lock drive.

6. The door lock of claim 5, wherein the lock drive includes a drive wheel that is mounted to the body and that is coupled to both the forward and reverse drive gears such that movement of the forward drive gear or the reverse drive gear rotates the drive wheel.

7. The door lock of claim 6, wherein the thumb turn is coupled for movement with the drive wheel such that movement of the thumb turn moves the drive wheel, and movement of the drive wheel moves the thumb turn.

8. The door lock of claim 1, further comprising a transmission coupled between the drive motor and the clutch gear.

9. The door lock of claim 8, wherein the transmission includes a pair of bevel gears including a first bevel gear mounted to a drive shaft of the drive motor, and a second bevel gear mounted to the body.

10. The door lock of claim 1, further comprising:
- a position gear that is coupled to the reverse drive gear, the position gear having mounted thereon a position sensor;
- wherein the forward drive gear and the reverse drive gear are arranged such that:
  - when the drive motor is driven in a locking direction, the clutch gear moves toward and engages with the forward drive gear, and
  - when the drive motor is driven in an unlocking direction, the clutch gear moves toward and engages with the reverse drive gear.

11. The door lock of claim 1, further comprising a tailpiece receiver coupled with the thumb turn and adapted to receive a tailpiece of a pre-existing lock distinct from the door lock.

12. The door lock of claim 11, wherein:
- responsive to the clutch gear being coupled with the lock drive, operation of the drive motor to rotate the clutch gear causes the tailpiece receiver to operate, via the tailpiece, the pre-existing lock; and
- responsive to the clutch gear not being coupled with the lock drive, movement of the tailpiece receiver does not rotate the clutch gear.

13. A door lock comprising:
- a body adapted to be mounted to a door and having a base, wherein the base has a curved slot formed therein;
- a lock drive movably mounted to the base of the body and adapted to move a lock mechanism between locked and unlocked positions;
- a thumb turn movably mounted to the body and adapted for manual movement between at least two positions, the thumb turn being coupled to the lock drive such that movement of the thumb turn moves the lock drive;
- a drive motor mounted to the base of the body; and
- a clutch that is mechanically arranged between the drive motor and the lock drive, the clutch including
  - a forward drive gear and a reverse drive gear that are both mounted to the base of the body and coupled to the lock drive, and
  - a clutch gear having a pivot axis, the clutch gear being mounted in the curved slot of the base, wherein:
    - the clutch gear is configured for displacement along the curved slot between an engaged position in which the clutch gear is coupled with the lock drive and a disengaged position in which the clutch gear is not coupled with the lock drive,
    - the clutch gear is configured for rotation about the pivot axis,
    - the clutch gear is operably coupled with the drive motor such that movement of the drive motor effects rotation of the clutch gear about the pivot axis, and
    - the rotation of the clutch gear about the pivot axis effects displacement of the clutch gear along the curved slot to selectively couple and uncouple the drive motor to the forward drive gear and the reverse drive gear,
- wherein the curved slot has a position where positioning the pivot axis of the clutch gear causes the clutch gear to engage with the reverse drive gear, and
- wherein energizing the drive motor for a predetermined interval of time displaces the clutch gear between the engaged position and the disengaged position.

14. The door lock of claim 13, wherein the engaged position is either of:
- a first engaged position, in which the clutch gear is engaged with the forward drive gear, or
- a second engaged position in which the clutch gear is engaged with the reverse drive gear.

15. The door lock of claim 14, wherein the first engaged position is a forward engaged position such that rotation of the forward drive gear rotates the lock drive in a forward direction, and the second engaged position is a rearward engaged position such that rotation of the reverse drive gear rotates the lock drive in a reverse direction.

16. The door lock of claim 15, wherein the disengaged position is located on the curved slot between the forward engaged position and the rearward engaged position.

17. The door lock of claim 16, wherein rotation of the drive motor in a first direction displaces the clutch gear along the curved slot toward the forward engaged position, and rotation of the drive motor in a second direction displaces the clutch gear along the curved slot toward the rearward engaged position.

18. The door lock of claim 13, wherein the lock drive includes a drive wheel mounted to the body that is coupled to the forward and reverse drive gears.

19. The door lock of claim 18, wherein the thumb turn is coupled for movement with the drive wheel such that movement of the thumb turn moves the drive wheel, and movement of the drive wheel moves the thumb turn.

20. The door lock of claim 19, wherein rotation of the drive motor in a first direction causes the clutch gear to be displaced along the curved slot by reaction forces arising from interactions between the clutch gear, the forward drive gear and the curved slot.

21. A method of operating a door lock, the method comprising:
- receiving, via a wireless communication device, a command to control a door lock having a lock drive that is configured to move a lock mechanism between a locked position and an unlocked position;
- after receiving the command, controlling a drive motor that is coupled to the lock drive via a clutch gear that selectively engages with either a reverse drive gear used to move the lock mechanism to the unlocked position or a forward drive gear used to move the lock mechanism to the locked position, wherein the drive motor operates in a first direction for a first period of time that is sufficient to (a) displace the clutch gear to a first position where torque is transmitted to the lock drive via the clutch gear and either the reverse drive gear or the forward drive gear, and (b) move the lock mechanism between the locked position and the unlocked position;
- detecting a position of the lock drive using a position sensor that is mounted to a position gear that is coupled to the reverse drive gear;

after moving the lock mechanism between the locked position and the unlocked position, and in response to detecting that the lock drive is positioned such that the lock mechanism in the locked position or the unlocked position, controlling the drive motor to (a) operate in a second direction that is opposite the first direction, and (b) move the clutch gear so as to decouple the drive motor from the lock drive; and in response to detecting that the clutch gear has disengaged from the forward drive gear, deactivating the drive motor.

22. The method of claim 21, wherein operating the drive motor in the first direction causes the lock mechanism to move to the unlocked position.

* * * * *